(12) United States Patent
Scroggie et al.

(10) Patent No.: US 7,351,023 B2
(45) Date of Patent: Apr. 1, 2008

(54) W-BASE RETAINER

(75) Inventors: Derek Scroggie, Macomb, MI (US); Robert Osterland, East China, MI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 11/384,796

(22) Filed: Mar. 20, 2006

(65) Prior Publication Data

US 2007/0217890 A1    Sep. 20, 2007

(51) Int. Cl.
*F16B 19/00* (2006.01)
(52) U.S. Cl. ............ 411/508; 411/913; 24/297
(58) Field of Classification Search ........ 411/508–510, 411/913, 459; 24/297, 291–295; 52/716.5–716.7
See application file for complete search history.

(56) References Cited

U.S. PATENT DOCUMENTS

| | | | | |
|---|---|---|---|---|
| 2,201,509 A | * | 5/1940 | Uum | 24/293 |
| 2,540,396 A | * | 2/1951 | Krach | 24/293 |
| 2,746,111 A | * | 5/1956 | Chvosta | 24/293 |
| 2,977,652 A | * | 4/1961 | Cochran | 24/293 |
| 3,627,362 A | * | 12/1971 | Brenneman | 52/586.2 |
| 4,363,160 A | * | 12/1982 | Wibrow | 24/297 |
| 4,495,380 A | * | 1/1985 | Ryan et al. | 174/138 D |
| 4,524,494 A | * | 6/1985 | Sato et al. | 24/453 |
| 5,314,280 A | * | 5/1994 | Gagliardi et al. | 411/182 |
| 6,042,296 A | * | 3/2000 | Wittig et al. | 403/298 |
| 6,575,681 B2 | * | 6/2003 | Kojima et al. | 411/508 |
| 6,581,252 B1 | * | 6/2003 | Sedlock et al. | 24/297 |
| 6,952,863 B2 | * | 10/2005 | Draggoo et al. | 24/297 |
| 7,114,221 B2 | * | 10/2006 | Gibbons et al. | 24/289 |

* cited by examiner

*Primary Examiner*—Flemming Saether
(74) *Attorney, Agent, or Firm*—Mark W. Croll; Paul F. Donovan

(57) ABSTRACT

A w-base retainer that may be used in many applications, including numerous applications throughout the automotive industry, includes two-stage double-snap-over w-base features with opposite w-base features for assembling moldings to a sheet metal or substrate panel. The w-base retainer will improve the ease of assembly of parts, provide a proper fit, and provide a functional retention of moldings to structural panels. The w-base retainer may be used on, for example, automotive body side moldings, including, for example, doors, pillars, green house moldings and other moldings.

20 Claims, 2 Drawing Sheets

US 7,351,023 B2

W-BASE RETAINER

FIELD OF THE INVENTION

The present invention relates generally to retainers or fasteners, and more particularly, to w-base retainers or fasteners.

BACKGROUND OF THE INVENTION

It is known that retainers or fasteners are used in various applications to perform various functions. It is further known that numerous types of retainers or fasteners are used in various automotive applications. A common fastener that is widely used throughout a vehicle is known as a w-base or w-prong retainer or fastener (hereinafter "w-base retainer"). The w-base retainer type and its fastening scheme provide a simple yet effective solution to many fastening needs. As a result, this retainer is economical, functional, and widely accepted among the automotive industry.

Regardless of size or complexity, the w-base retainer utilizes some basic principles in fastening. These principles include multiple legs that compress towards a common member, of which the legs are attached, during the installation in a hole or opening. These legs then engage the backside of the hole to which the retainer is mounted to hold the retainer in a mounted position within the hole. The retainer also includes a head or similar structure that permits items to be mounted to the retainer. The w-base retainer provides an excellent method of retention with an outstanding insertion to extraction ratio.

Exemplary w-base fasteners or retainers are disclosed in U.S. Pat. Nos. 5,851,097 and 5,797,714, both assigned to Illinois Tool Works, Inc. Other known w-base retainers include a single w-base feature on each side of the retainer base to allow for hole to hole applications only. Another known w-base retainer includes a bullhorn style attachment feature on one side of the retainer base. This configuration has proven to be somewhat difficult to assemble to a molding opening.

The embodiments of the invention improve upon these and other known w-base retainers by providing a w-base retainer that improves the ability to assemble moldings to structural panels, such as sheet metal or substrate panels, for example. The embodiments of the invention also improve the ease of assembly of parts and ensure a proper fit of these parts. Additionally, the embodiments of the invention provide the requisite functional retention of moldings to structural panels, as is required in, for example, automotive applications.

SUMMARY OF THE INVENTION

The present invention is directed to, in an exemplary embodiment, a w-base retainer having two-stage double-snap-over w-base features with opposite w-base features for assembling, for example, moldings to sheet metal or a substrate panel. The exemplary w-base retainer may be used in numerous automotive applications, including on automotive body side moldings, including, for example, doors, pillars, green house moldings and other areas.

Significantly, the embodiments of the invention provide an exemplary retainer that is easily assembled to the molding, for example, at a stage-one position and holds the retainer in place until a secondary fixture or machine drives the retainer in place to a final position, if needed. The exemplary retainer also provides an easy assembly to the molding at a stage-two position. Additionally, the dual w-base feature of the exemplary retainer provides a built in anti-rotation feature. The dual w-base feature also holds the retainer to the molding for shipment and final assembly to the sheet metal or substrate panel.

Other features and advantages of the invention will become apparent to those skilled in the art upon review of the following detailed description, claims and drawings in which like numerals are used to designate like features.

Figure 1:
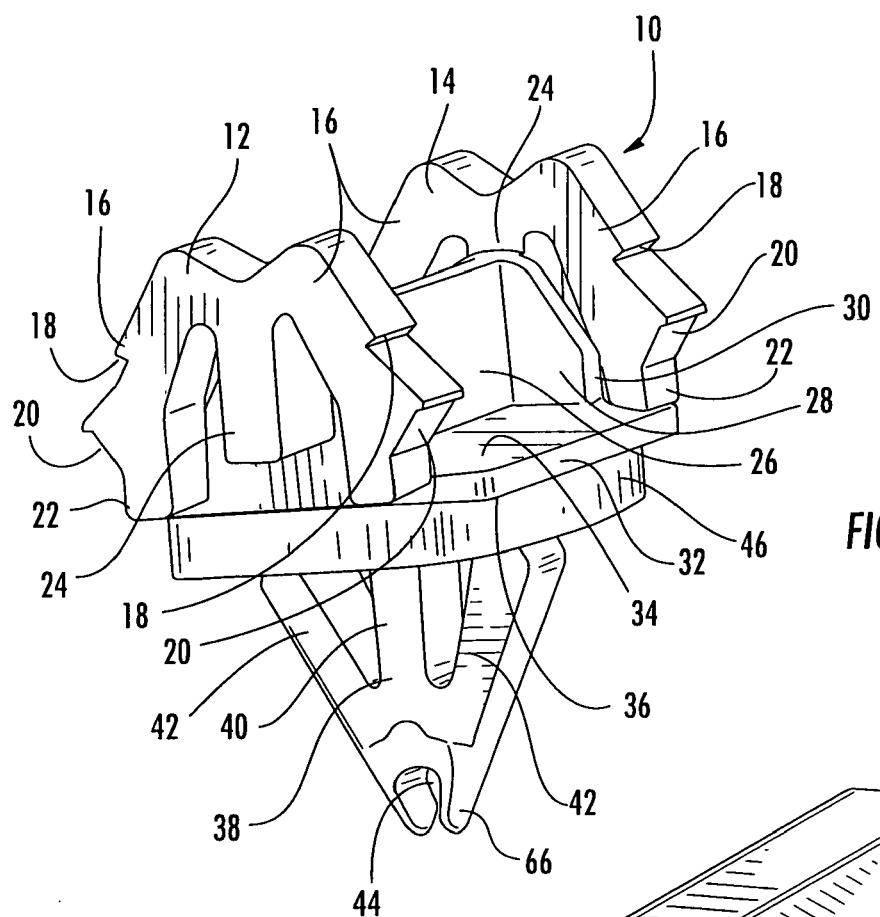
FIG. 1 is an isometric view of an exemplary embodiment of a w-base retainer of the present invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE EMBODIMENTS

The present invention may be embodied in many forms. In one exemplary embodiment depicted in FIG. 1, the present invention is directed to a w-base retainer 10 that, as discussed below, may be used in numerous automotive applications. The w-base retainer 10 provides the ability to assemble moldings to structural panels, such as sheet metal or substrate panels. The w-base retainer 10 includes two-stage double-snap-over w-base features with opposite w-base features, described below, for assembling moldings to the sheet metal or substrate panel. The w-base retainer 10 improves the ease of assembly of parts, ensures a proper fit, and provides the necessary functional retention of moldings to structural panels.

As shown in FIGS. 1 and 4-7, the w-base retainer 10, which may be made of plastic or any other suitable material, includes a molded retainer body with dual w-base features 12, 14 on one side of a retainer base 32 and a single w-base feature 38 on the other. Specifically, in an exemplary embodiment, the dual w-base features include a first two-stage w-base feature 12 and a second two-stage w-base feature 14. The first and second w-base features 12, 14 extend outwardly from the retainer base 32 in an aligned and substantially parallel manner. In an alternative arrangement, only a first two-stage w-base feature is utilized. Each of the features 12, 14 include opposing wings or flexible members 16. Each wing or flexible member 16 includes a stage-one snap groove 18, a stage-two holding angle surface 20 and an anti-fishhook extension feature 22. As depicted, each of the wings 16 of each two-stage feature 12, 14 are connected by a center rib 24 that joins the wings. The center ribs 24 are spaced apart from each other on the retainer base 32 and are connected by a center support rib 26. The center support rib includes opposing cross support ribs 28 extending outwardly approximately ninety degrees from the center support rib 26. In the exemplary embodiment, four opposing cross support ribs 28 are configured with the center support rib 26 to secure the center support rib 26 in position, and to ensure the w-base features 12 and 14 maintain a center position within an opening 53 (see FIG. 2) in the molding. One of skill in the art will appreciate that other numbers, shapes and configurations of the support ribs are possible with the retainer. Each of the cross support ribs 28 includes a locating surface 30 that, once the retainer 10 is installed to a molding, controls the retainer and mounted molding position against a cross load, or similar type loading conditions. The locating surface 30 may include a v-shaped surface configuration, not shown, that may be used to further assist in the mounting of the retainer to the molding. The v-shaped surface may further maintain the retainer's position in the molding opening and prevent the retainer from sliding along the molding opening.

The retainer 10 further includes the retainer base 32 defining a first side 34 from which extends the first and second two-stage w-base features 12 and 14. The retainer base 32 defines a second side 36 from which extends the single w-base feature 38. The retainer base 32 also is configured to prevent the retainer 10 from passing through the hole or opening to which it is mounted. The retainer base 32 may define numerous shapes and configurations including the depicted disk shaped configuration.

Figure 3:
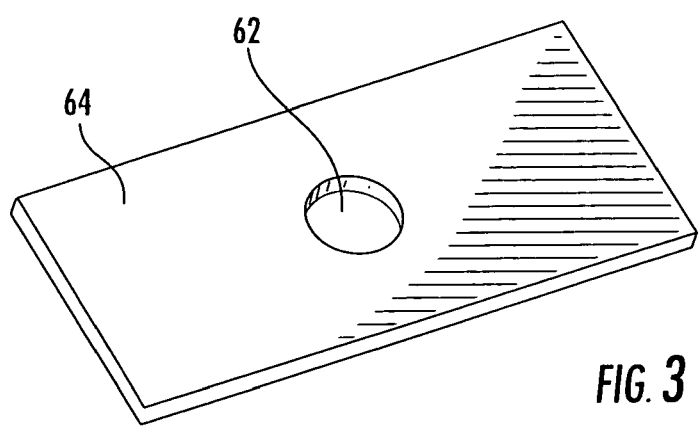
FIG. 3 is an isometric partial view of an exemplary panel for use with the w-base retainer of FIG. 1.

The w-base feature 38 includes a center post 40 with two opposing wings or flexible members 42 extending outwardly from the center post 40. The wings 42 are joined at a common, relatively pointed end and to the center post 40. The center post 40 may define a cylindrical or rectangular configuration or any other possible configuration and may define a key-hole slot 44. The keyhole slot 44 provides an ergonomic benefit to the assembly load requirement of the retainer 10 in that it permits easier insertion of the w-base feature 38 to, for example, a hole 62 in a panel 64 (FIG. 3). The end of the center post 40 further defines an extension lead-in nose feature 66 to assist in locating the w-base feature 38 to the hole 62 (FIG. 3).

Turning back to FIG. 1, the opposing wings 42 may be any flexible members that are configured to flex toward each other and snap-fit within the hole in which the retainer is mounted to provide a connection between the retainer and the hole. A seal 46 may be positioned over the center post 40 and adjacent to the second side 36 of the retainer base 32. The seal 46, which may be any suitable foam material, protects against the intrusion of contaminants such as water, vapor and dirt, as well as other conditions such as wind noise into the hole in which the retainer is mounted.

Figure 2:
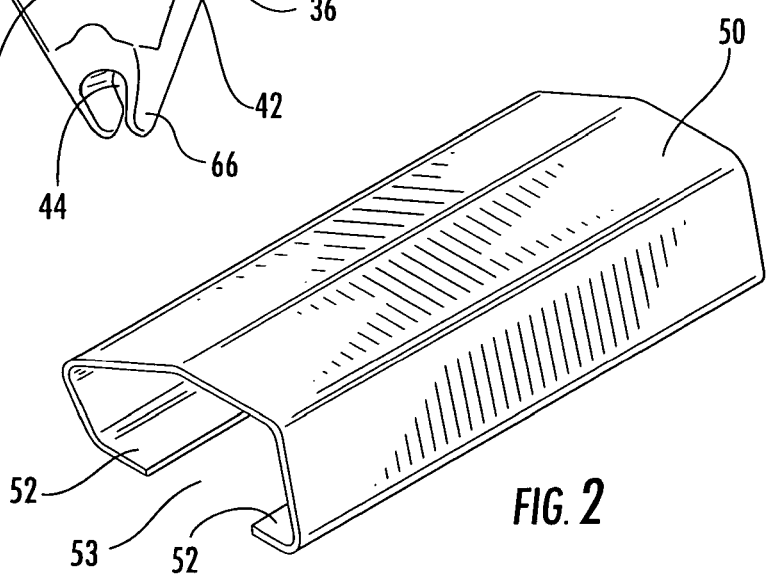
FIG. 2 is an isometric view of an exemplary molding that may be mounted to the w-base retainer of FIG. 1.

Referring to FIG. 2, an exemplary molding 50 may include opposing molding flanges 52 between which form a molding opening 53 that defines a slot or similar configuration. The molding 50 may define other known molding configurations.

Referring to FIG. 3, an exemplary panel 64 is depicted illustrating an exemplary hole 62. The single w-base feature 38 is configured to engage with the hole 62 and the panel 64 to mount the retainer 10 to the panel 64, as described below. As will be understood by those skilled in the art, the panel may be any type of panel or substrate to which a molding or other structure may be mounted. Additionally, the hole 62 may be sized and shaped to accommodate other w-base feature configurations.

Figure 4:
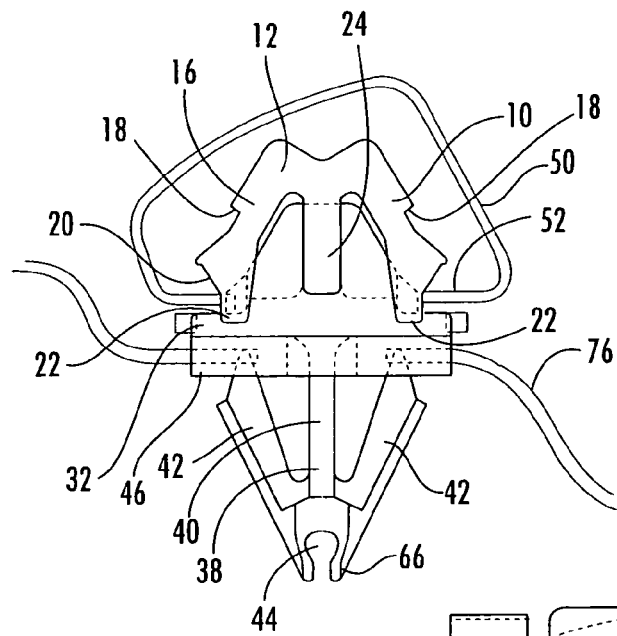
FIG. 4 is a side elevation view of the w-base retainer of FIG. 1 illustrating the molding of FIG. 2 mounted to the retainer and the retainer mounted to an exemplary panel.
Figure 5:
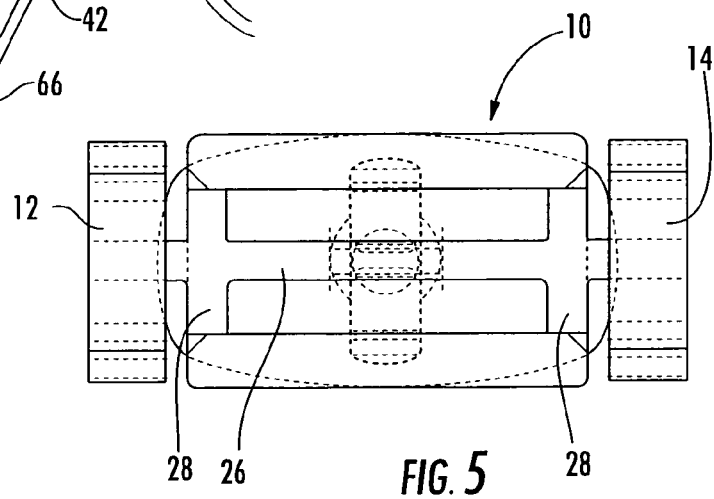
FIG. 5 is a top view of the w-base retainer of FIG. 1.
Figure 6:
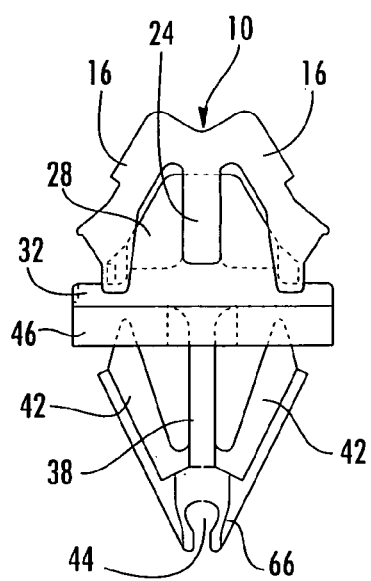
FIG. 6 is a side elevation view of the w-base retainer of FIG. 1.
Figure 7:
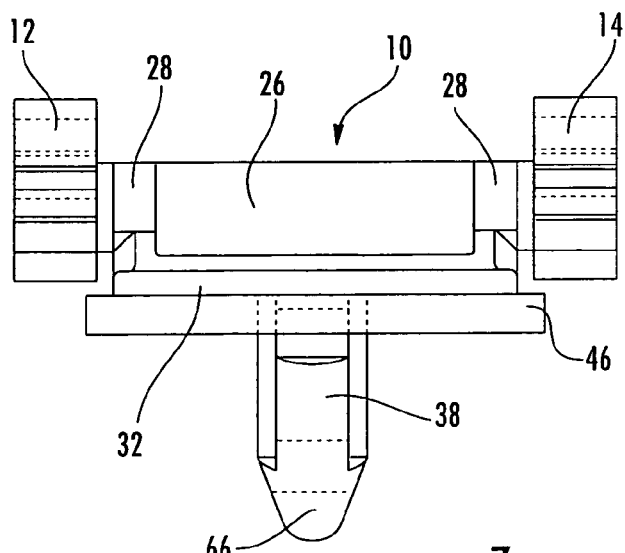
FIG. 7 is another side elevation view of the w-base retainer of FIG. 1.

As shown in FIG. 4, the dual w-base features 12 and 14 may be assembled to the flanges 52 in the molding 50 and into opening 53 and along the slot defined by the opening 53. Note that for clarity purposes, only w-base feature 12 is depicted in FIG. 4. W-base feature 14 is mounted to the molding 50 in the same manner as w-base feature 12. The dual w-base features 12, 14 provide a configuration that allows for the retainer 10 to be oriented properly onto the molding 50 and more specifically to the flanges 52 of the molding. The retainer 10 will also properly orient the molding 50 onto an exemplary panel 64. The w-base features 12, 14 provide an anti-rotation feature that prevents rotation of the retainer relative to the molding.

During installation of the molding 50 to the retainer 10, the opposing molding flanges 52 first engage the opposing wings 16 of the first and second two-stage w-base features 12, 14 and snap-fit into the stage-one grooves 18. This first stage allows for the easy assembly of the retainer 10 to the molding 50, thus holding the retainer 10 in position prior to a secondary assembly step. The secondary assembly step may include the use of a fixture or machine that causes the opposing flanges 52 to progress along the opposing wings 16 towards the stage-two holding angle surfaces 20. The retainer 10 is fully assembled to the molding 50 when the opposing flanges 52 are snap-fit around the holding angle surfaces 20 and are seated below the surfaces 20 and against the retainer base 32. It should be understood that the use of secondary equipment may not be required to complete this secondary assembly step. Rather, the retainer 10 and molding 50 may be manually pressed together, thereby fully assembling the retainer 10 to the molding 50. Once fully assembled, the w-base features 12, 14 will prevent rotation of the retainer relative to the molding. Also after assembly, the molding and mounted retainer may be shipped to a final assembly plant as part of the molding assembly to a vehicle.

As can be appreciated, the center rib 24 provides the structural support for the wings 16. The wings 16 along with the stage-two holding angle surfaces 20 provide the required holding and attachment of the retainer 10 and molding 50 against the retainer base 32. The anti-fishhook extension feature 22 keeps the molding flanges 52 from hooking underneath the wings 16 and maintaining it in the area of the holding angle surfaces 20. The cross support ribs 28 with locating surface 30 provide for the desired predetermined fit and control between the molding flange 52 opening and the retainer 10, as well as providing protection to the wings 16 from being collapsed from any cross-load. In this situation, the locating surface 30 will serve as a stop to prevent over-flexing of the wings 16 due to a cross-loading condition on the molding or molding flanges.

The single w-base feature 38 protrudes from the retainer base 32 and is configured to engage with, for example, the hole 62 formed in the panel 64 (FIG. 3). The center post 40 provides the structural support of the wings 42, which may flex relative to the post 40. During installation into the hole 62, for example, the wings 42 flex inward by pressure exerted on the legs by the edge of the hole 62. After completely passing through the hole 62, the wings 42 flex outward creating an interference between the backside of the panel 64 and the wings 42. Once mounted, the retainer base 32 and seal 46, if used, will contact the front side of the panel 64, while the wings 42 contact the backside of the panel 64, thereby securing the retainer 10 to the panel 64. As described above, the molding 50 is mounted to the retainer 10 vis-á-vis the wings 16, thereby securing the molding to the panel.

Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What claimed is:

1. A w-base retainer comprising:
   a retainer base defining a first side and a second side;
   at least two w-base features, each w-base feature extending outwardly from the first side of the retainer base, each w-base feature including wings that further define a groove formed in each wing, the at least two w-base features are joined by a support rib and spaced apart across a first surface of the first side; and
   a third w-base feature extending outwardly from the second side of the retainer base, the third w-base feature defining a post and flexible members extending outwardly from the post.

2. The w-base retainer of claim 1, wherein each w-base feature extends outwardly from the first side of the retainer base in a substantially perpendicular manner to the retainer base.

3. The w-base retainer of claim 1, wherein each of the wings defines angled surfaces at distal ends of the wings.

4. The w-base retainer of claim 1, wherein each of the wings are joined by a center rib.

5. The w-base retainer of claim 1, wherein the post of the third w-base feature defines a key slot and at least one inclined surface.

6. The w-base retainer of claim 1, further comprising a seal configured over the post of the second w-base feature.

7. The w-base retainer of claim 1, wherein each of the wings defines an anti-fishhook extension.

8. A w-base retainer comprising:
   a retainer base defining a first side and a second side;
   the first side further defining a first surface;
   a first w-base feature and a second w-base feature spaced apart across on and extending outwardly from the first surface of the retainer base, the first and second w-base features each include flexible members that further define a groove and an angled surface;
   at least one support rib joining and supporting the first and second w-base features;
   wherein the at least one support rib has cross supports configured to secure the support rib in position; and
   a third w-base feature extending outwardly from the second side of the retainer base, the third w-base feature defining a post and flexible members joined at a common end and extending outwardly from the post.

9. The w-base retainer of claim 8, wherein the first and second w-base features extend outwardly from the first side of the retainer base in a substantially aligned and parallel manner.

10. The w-base retainer of claim 8, wherein the angled surfaces are at distal ends of each of the flexible members.

11. The w-base retainer of claim 8, wherein each of the flexible members of the first and second w-base features are joined by a center rib.

12. The w-base retainer of claim 8, wherein the post of the third w-base feature defines a key slot and at least one inclined surface.

13. The w-base retainer of claim 8, further comprising a seal positioned on the second side of the retainer base.

14. The w-base retainer of claim 8, wherein each of the flexible members defines an anti-fishhook extension.

15. The w-base retainer of claim 9, further comprising at least one cross support rib joined to the at least one support rib, the at least one cross support rib defining a locating surface.

16. A w-base retainer mountable to a molding and a panel, wherein the molding defines molding flanges and the panel includes a hole, comprising:
   a retainer base defining a first side and a second side;
   the first side further defining a first surface;
   a first w-base feature and a second w-base feature joined by support rib and spaced apart across on and extending outwardly from the first surface of the retainer base and mountable to the molding, the first and second w-base features each include flexible members that further define a groove and an inclined surface; and
   a third w-base feature extending outwardly from the second side of the retainer base, the second w-base feature defining a post and flexible members joined at a common end and extending outwardly from the post, the flexible members mountable to the hole in the panel.

17. The w-base retainer of claim 16, wherein the first and second w-base features extend outwardly from the first side of the retainer base in a substantially aligned and parallel manner.

18. The w-base retainer of claim 16, wherein the flanges of the molding engage the groove on each flexible member in a first-stage position and engage the inclined surface on each flexible member in a second-stage position.

19. The w-base retainer of claim 16, further comprising a seal positioned on the second side of the retainer base.

20. The w-base retainer of claim 16, further comprising the support rib defining a locating surface for positioning the molding on the retainer.

* * * * *